United States Patent Office 3,699,085
Patented Oct. 17, 1972

3,699,085
PREPARATION OF p-BENZAMIDE POLYMERS
AND INTERMEDIATES THEREOF
Thomas Albert Johnson, Newark, Del., assignor to E. I.
du Pont de Nemours and Company, Wilmington, Del.
No Drawing. Filed Apr. 20, 1971, Ser. No. 135,808
Int. Cl. C08g 20/20, 20/04
U.S. Cl. 260—78 A                                      36 Claims

ABSTRACT OF THE DISCLOSURE

A process which comprises reacting p-aminobenzoic acid or its hydrochloride with thionyl chloride in the presence of a nitrogen containing base compound at a temperature of from about $-10°$ C. to $95°$ C. to prepare high molecular weight p-benzamide polymers and one or more intermediates therefor.

---

This invention to a process for preparing intermediates for p-benzamide polymers. More particularly, this invention relates to a process for preparing one or more of the intermediate compounds: p-thionylaminobenzoyl chloride, p-aminobenzoyl chloride hydrochloride, 4-(4'-aminobenzamido)benzoyl chloride hydrochloride and oligomers of p-aminobenzoyl chloride hydrochloride in a sufficient state of purity to be converted directly into polymers without intermediate purification steps.

This invention also relates to a process for preparing p-benzamide polymers directly from the pure intermediates so produced.

BACKGROUND OF THE INVENTION

High molecular weight p-benzamide polymers are generally prepared by the polymerization of p-aminobenzoyl chloride hydrochloride, as described in French Pat. No. 1,526,745. The prior art procedures for obtaining p-benzamide polymers involve an indirect, cumbersome route from p-aminobenzoic acid involving isolation and purification techniques. The intermediate p-aminobenzoyl chloride hydrochloride is obtained by treating a p-aminobenzoic acid with thionyl chloride to produce p-thionylaminobenzoyl chloride according to the procedure of Graf and Langer, J. Prakt. Chem. 148, 161–169 (1937) and the thionylamino derivative produced is converted to p-aminobenzoyl chloride hydrochloride by reaction with aminobenzoyl chloride by the non-catalytic procedure of Graf and Langer requires reaction temperatures which promote the formation of side reactions, thereby producing contaminants which, if not removed, are carried through to the polymers produced. Purification procedures for the p-thionylaminobenzoyl chloride are difficult. Lorenz and Mischk in Makrom. Chem. 130, 55–64 (1969) reported that p-thionylaminobenzoyl chloride decomposed when distillation was attempted. The conversion product, p-aminobenzoyl chloride hydrochloride, is relatively unstable and cannot be subjected to known purification procedures.

The above processes of the prior art involve non-catalytic indirect reactions to produce the p-benzamide polymers from p-aminobenzoic acid wherein at least one of the intermediates must be purified prior to further use in order to prepare high molecular weight polymer.

Other prior art processes such as those described by Broderick and von Schuh in Ber. 81, 215–221 (1948) offer circuitous routes for the preparation of certain carbonyl chloride hydrochloride precursors.

It is an object of this invention to provide a process for preparing sufficiently pure intermediates for high molecular weight poly-p-benzamide from p-aminobenzoic acid or its hydrochloride. It is further an object of this invention to provide a process for the direct preparation of p-benzamide polymers from p-aminobenzoic acid or its hydrochloride without purification of intermediate species.

SUMMARY OF THE INVENTION

In accordance with the invention, it has been surprisingly found that sufficiently pure intermediates for p-benzamide polymers can be prepared by reacting p-aminobenzoic acid or its hydrochloride with at least one mole of thionyl chloride in the presence of an organic nitrogen containing base compound at a temperature of from about $-10°$ C. to about $95°$ C. thereby permitting their direct conversion to poly-p-benzamide without purification.

Thus the invention provides a novel process wherein one mole of p-aminobenzoic acid or its hydrochloride is reacted with at least one mole of thionyl chloride in the presence of at least 0.1 mole of an organic nitrogen containing base compound selected from the group consisting of a tertiary $C_1-C_4$ alkyl amine, a heterocyclic tertiary amine, an $N-C_1-C_4$ alkyl substituted amide of an organic carboxylic acid having at least 2 and generally not more than 7 carbon atoms, an $N-C_1-C_4$ substituted lactam of an $\omega$-amino acid containing 4 to 6 carbon atoms, tetramethylurea, hexamethylphosphoramide at a temperature of from about $-10°$ C. to $95°$ C. to prepare one or more intermediates which can be converted directly to high molecular weight p-benzamide polymers. As a further embodiment of this invention, there is provided herein a process for preparing p-benzamide polymers directly from (1) thionyl chloride and p-aminobenzoic acid and (2) from the intermediates of this invention.

Direct preparation of p-benzamide polymers from thionyl chloride and p-aminobenzoic acid or p-aminobenzoic acid hydrochloride is achieved for example by carrying out the reaction utilizing one mole of p-aminobenzoic acid and at least 2 moles of thionyl chloride in the presence of 3 to 30 moles of a base compound selected from the group consisting of a tertiary $C_1-C_4$ alkyl amine, a heterocyclic tertiary amine, an $N-C_1-C_4$ alkyl substituted amide of an organic carboxylic acid having at least 2 and generally not more than 7 carbon atoms, an $N-C_1-C_4$ substituted lactam of an $\omega$-amino acid containing 4 to 6 carbon atoms, tetramethylurea, hexamethylphosphoramide followed by the addition of 1 to 2 moles of water or a water precursor at a temperature of from about $-10°$ C. to about $25°$ C. When p-aminobenzoic acid hydrochloride is reacted with thionyl chloride, the reaction is conducted in the presence of at least 4 moles of the base compound.

The preparation of p-benzamide polymers directly from the intermediates of this invention is disclosed hereinafter.

To provide an understanding of the terms used in this specification, an explanation by way of definitions is included with the intent that, wherever the terms appear, they are to be construed in accordance with such definitions.

The term dimer as used hereinafter refers to the dimer of p-aminobenzoyl chloride hydrochloride which is defined as the compound, 4-(4'-aminobenzamido)benzoyl chloride hydrochloride.

The term oligomers as used hereinafter refers to oligomer of p-aminobenzoyl chloride hydrochloride which is defined by the formula

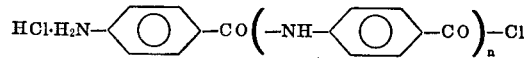

wherein $n$ is 2 to 50.

Dimer may also be defined as the compound of the above formula wherein $n=1$.

The term solvent is defined as a liquid capable of dissolving the hydrochloride of the base compound but which is not a solvent for the dimer and/or oligomer.

The term non-solvent is defined as a liquid in which the base hydrochloride and the dimer and/or oligomers are essentially insoluble.

Inherent viscosity ($N_{inh}$) is defined by the following equation:

$$N_{inh} = \frac{\ln(N_{rel})}{C}$$

wherein ($N_{rel}$) represents the relative viscosity, (C) represents a concentration of 0.5 g. of the polymer in 100 ml. of solvent. The relative viscosity ($N_{rel}$) is determined by dividing the flow time in a capillary viscometer of a dilute solution of the polymer by the flow time for the pure solvent. The dilute solution used herein for determining ($N_{rel}$) is of the concentration expressed by (C) above; flow times are determined at 30° C., using concentrated (95–98%) sulfuric acid as solvent.

Fiber properties of tenacity, elongation and initial modulus are coded as $T/E/M_i$ and are in units of grams/denier, percent and grams/denier, respectively. Parts and percentages are by weight unless otherwise indicated.

The equivalent percent of active oligomer given in the examples is determined by a calibrated infrared spectral method. The oligomeric product has a characteristic absorption at 760 cm.$^{-1}$ while the dimeric product has a characteristic absorption at 735 cm.$^{-1}$. A sample of the product mixture is carefully washed free of the base hydrochloride using methylene chloride. The sample is then mulled in Nujol and the spectrum is taken. The equivalent percent of active oligomer is then calculated using the following equation:

Equiv. percent oligomer $$= \frac{A_{760\ cm.^{-1}}}{A_{760\ cm.^{-1}} + A_{735\ cm.^{-1}}} \times K \times 100$$

wherein $A_{760\ cm.^{-1}}$ and $A_{735\ cm.^{-1}}$ are the heights of the 760 cm.$^{-1}$ absorption and the 735 cm.$^{-1}$ absorption measured from the base line. K is a correction factor determined experimentally, which converts the expression to give equivalent percent oligomer. K was determined by preparing mixtures of oligomer and dimer of known composition and running infrared spectra of the mixtures and calculating K as follows:

$$K = \frac{\text{equivalent fraction oligomer}}{\frac{A_{760\ cm.^{-1}}}{A_{760\ cm.^{-1}} + A_{735\ cm.^{-1}}}}$$

All infrared spectra were taken on samples prepared in the above manner and thus the samples are free of base hydrochloride unless stated otherwise.

By essentially oligomer is meant having 75% or more oligomer. Essentially dimer is defined as 75% or more of dimer.

By base hydrochloride is meant the hydrochloride of the organic nitrogen containing base compound used as a catalyst in the reaction.

The term intermediate compounds is used hereinafter to refer to intermediate compounds for poly p-benzamide. Representative examples of the intermediate compounds of this invention include p-thionylaminobenzoyl chloride, p-aminobenzoyl chloride hydrochloride; 4-(4'-aminobenzamido)-benzoyl chloride hydrochloride, oligomers of p-aminobenzoyl chloride hydrochloride and mixtures thereof.

The term organic nitrogen containing base compound also referred to as base compound are compounds selected from the group consisting of a tertiary $C_1$–$C_4$ alkyl amine, a heterocyclic tertiary amine, an N–$C_1$–$C_4$ alkyl substituted amide of an organic carboxylic acid having at least 2 and generally not more than 7 carbon atoms, an N–$C_1$–$C_4$ substituted lactam of a $\omega$-amino acid containing 4 to 6 carbon atoms, tetramethylurea, hexamethylphosphoramide.

When the term direct is used herein with respect to the preparation of polymers, it refers to the polymerization of the intermediates without isolation or purification steps.

Conversely, the term indirect refers to polymer preparation involving previous separation and purification techniques.

One or more intermediates for high molecular weight p-benzamide polymers selected from the group consisting of p-thionylaminobenzoyl chloride, p-aminobenzoyl chloride hydrochloride, 4-(4'-aminobenzamido)benzoyl chloride hydrochloride and oligomers of p-aminobenzoyl chloride hydrochloride are produced by reacting one mole of p-aminobenzoic acid with at least 2 moles of thionyl chloride in the presence of at least 0.1 mole of a base compound selected from the group consisting of a tertiary $C_1$–$C_4$ alkyl amine, a heterocyclic tertiary amine, and N–$C_1$–$C_4$ alkyl substituted amide of an organic carboxylic acid having at least 2 and generally not more than 7 carbon atoms, an N–$C_1$–$C_4$ substituted lactam of an $\omega$-amino acid containing 4 to 6 carbon atoms, tetramethylurea, hexamethylphosphoramide and a solvent or non-solvent at a temperature of from about −10° C. to about 95° C.

When the objective is to produce one or more intermediates selected from the group consisting of p-aminobenzoyl chloride hydrochloride, 4-(4'-aminobenzamido)benzoyl chloride hydrochloride and oligomers of p-aminobenzoyl chloride hydrochloride, one mole of p-aminobenzoic acid or its hydrochloride is reacted with at least 2 moles of thionyl chloride in the presence of at least 0.1 mole of a base compound selected from a tertiary $C_1$–$C_4$ alkyl amine, a heterocyclic tertiary amine, an N–$C_1$–$C_4$ alkyl substituted amide of an organic carboxylic acid having at least 2 and generally not more than 7 carbon atoms, an N–$C_1$–$C_4$ substituted lactam of an omega amino acid containing 4 to 6 carbon atoms, tetramethylurea, hexamethylphosphoramide and the hydrochloride of any thereof and with a solvent or nonsolvent at a temperature of from about −10° to about 95° C.

The role of the organic nitrogen containing base compound (or the base compound) is that of a catalyst. As little as a trace amount per mole of p-aminobenzoic acid is sufficient to overcome the disadvantages of conducting the reaction without a catalyst. The base compound or catalyst also functions as an acid acceptor. Accordingly, since hydrogen chloride is a product of the reaction, the base compound forms the hydrochloride of the base compound. However, the hydrochloride of the base compound may also be used in place of the base compound itself in the reaction except where a direct reaction from p-thionylaminobenzoyl chloride to p-benzamide polymers is desired. The base compound, though it is an acid acceptor, functions as a catalyst. Thus, the use of the hydrochloride of the base compound initially in place of the base compound itself is within the scope of this invention as it relates to the production of intermediates covered by this invention.

When at least 2 moles of thionyl chloride are reacted with one mole of p-aminobenzoic acid in the presence of at least 3 moles of the base compound using a solvent or nonsolvent at a temperature of from about −10° C. to 25° C., sufficiently pure p-thionylaminobenzoyl chloride is produced to be converted directly to polymer. However, when 0.1 to 3 moles of the base compound or the hydrochloride thereof are used under the same conditions and sufficient hydrogen chloride is added to the reaction mixture, p-aminobenzoyl chloride hydrochloride is produced.

When 1 to 2 moles of thionyl chloride are reacted with one mole of p-aminobenzoic acid in the presence of 0.1 to 3 moles of the base compound or the hydrochloride of the base compound at a temperature of from about —10° C. to about 95° C., one or more of the compounds selected from the group consisting of p-aminobenzoyl chloride hydrochloride, 4-(4'-aminobenzamido)benzoyl chloride hydrochloride and oligomers of p-aminobenzoyl chloride hydrochloride are produced.

When 1 to 1.2 moles of thionyl chloride are reacted with one mole of p-aminobenzoic acid in the presence of 0.5 to 1.0 mole of the base compound or the hydrochloride of the base compound at a temperature of from about —10° C. to 50° C., essentially 4-(4'-aminobenzamido)benzoyl chloride hydrochloride is produced. However, when the temperature is subsequently increased to a range of from about 50° C. to 95° C., essentially oligomers of p-aminobenzoyl chloride hydrochloride are produced.

Reacting 1 to 1.2 moles of thionyl chloride with one mole of p-aminobenzoic acid in the presence of 1 to 2 moles of the base compound or the hydrochloride thereof at a temperature of from about —10° C. to about 50° C., results in the production of a mixture of dimer and oligomers. However, when the temperature is subsequently increased to the range of from about 50° C. to about 95° C., essentially oligomers are produced.

When 1 to 1.2 moles of thionyl chloride are reacted with one mole of p-aminobenzoic acid in the presence of 2 to 3 moles of the base compound or the hydrochloride thereof at a temperature of from about —10° C. to about 50° C., essentially oligomers are produced.

Another method of producing p-benzamide polymers provided by the invention is that of removing by-product sulfur dioxide after formation of the dimer and/or oligomers and polymerizing in a suitable solvent, as hereinafter described.

Representative examples of the organic nitrogen containing compounds or base compounds as they are also referred to include tertiary $C_1$–$C_4$ alkyl amines such as trimethylamine, triethylamine, tripropylamine and tributylamine; heterocyclic tertiary amines such as pyridine, α-picoline, γ-picoline and N-methyl piperidine; N–$C_1$–$C_4$ alkyl substituted amides of an organic carboxylic acid having at least 2 carbon atoms and generally not more than 7 carbon atoms such as N-methylacetamide, N,N-dimethylacetamide, N,N-diethylacetamide, N,N-dipropylacetamide, N,N-dibutylacetamide, the N,N-di-$C_1$–$C_4$ alkyl propionamides, the N,N-di-$C_1$–$C_4$ butyramides, and the N,N-di-$C_1$–$C_4$ alkyl benzamides; N–$C_1$–$C_4$ substituted lactams of an omega amino acid containing 4 to 6 carbon atoms such as N-methyl pyrrolidone-2, N-ethyl pyrrolidone-2, N-propyl pyrrolidone-2, N-methyl piperidone-2, and N-methyl caprolactam; tetramethyl urea; hexamethylphosphoramide; and the hydrochloride of any thereof.

When it is desired to form high molecular weight, p-benzamide polymers without isolating the intermediate compound, it is preferred to use an N–$C_1$–$C_4$ alkyl substituted amide of an organic carboxylic acid having at least 2 carbon atoms. The preferred base compound in the preparation of intermediates and polymer is N,N-dimethylacetamide.

When the desired product is p-thionylaminobenzoyl chloride or p-aminobenzoyl chloride hydrochloride, the reaction is preferably carried out in a solvent or non-solvent medium.

In the preparation of dimer and/or oligomers, the reaction medium may be conducted in the absence of solvent or non-solvent, in the presence of a solvent and in the presence of a non-solvent. Maximum concentration and contact between reactants is achieved by carrying out the reaction in the absence of a solvent or non-solvent. Such reactions in order to be effective require sufficient and adequate agitation to achieve thorough mixing and contact between the reactans. Sulfur dioxide which is generated as a by-product in the reaction imparts some mobility to the reaction mass. In some cases, in order to enhance the fluidity of the reaction mass, more $SO_2$ may be added. The $SO_2$ is removed by evaporation at the end of the reaction. The product is thus obtained in admixture with the base hydrochloride as a dry, free flowing powder. This composition can then be advantageously used to prepare polymers directly without separation of the components.

When the preparation of the dimer and/or oligomer is carried out in the presence of a solvent, the product is isolated by filtration, or preferably when the product is desired in admixture with the base hydrochloride by evaporation of the solvent. Alternatively, the product may be obtained in admixture with the base hydrochloride by adding a non-solvent to the reaction mass containing a solvent as the liquid medium which causes the base hydrochloride to precipitate with the product.

When the preparation of the dimer and/or oligomer is carried out in the presence of a non-solvent, the product is recovered from the reaction mass by filtration or evaporation of the non-solvent and the product obtained is in admixture with the base hydrochloride. If it is desired to separate the product from the base hydrochloride, a solvent is added to the product in admixture with the base hydrochloride and the product recovered by filtration.

The amount of solvent or non-solvent used to create a liquid medium for the reaction is that amount that will provide an easily stirrable reaction mass. Generally, amounts of up to about one liter per mole of p-aminobenzoic acid are sufficient. More than about one liter results in a decrease in reaction rate.

Representative examples of non-solvents include aliphatic and aromatic hydrocarbons such as hexane, benzene and toluene; halogenated hydrocarbons such as carbon tetrachloride, chlorinated benzene, chlorinated toluene, trichlorofluoromethane, 1,1,2 - trichlorotrifluoroethane, 1,2-dichlorotetrafluoroethane, and dichlorofluoromethane; ethers such as glyme ($CH_3OCH_2CH_2OCH_3$), tetraglyme [$CH_3O(CH_2CH_2O)_4CH_3$], diethylether, tetrahydrofuran and dioxane; sulfones such as tetramethylene sulfone; and esters such as ethyl acetate, propyl acetate and butyl acetate.

Representative examples of solvents include methylene chloride, chloroform, acetonitrile and sulfur dioxide.

Thionyl chloride can also be used as a reaction medium, when the desired product is p-aminobenzoyl chloride hydrochloride, in which case an amount beyond that necessary for chlorination is used.

The reaction temperature ranges from about —10° C. to about 95° C., depending upon the product desired. The reaction to produce p-thionylaminobenzoyl chloride and p-aminobenzoyl chloride hydrochloride are both carried out at from about —10° C. to about 25° C., preferably from about 5° C. to 15° C. The reaction to produce dimer is carried out at a temperature of from about —10° C. to about 50° C. The reaction to produce essentially oligomer and mixtures of dimer and oligomer is each carried out at a temperature of from about —10° C. to about 95° C. The preparation of essentially oligomer may be achieved at a temperature of from about —10° C. to about 50° C. when additional base compound is added.

The temperature during the addition of the components of the reaction to the reaction vessel should preferably be kept below 25° C. to avoid formation of side products.

The reaction time varies from one to twenty hours, depending upon many factors, such as the temperature after addition, presence or absence of a solvent or non-solvent and the product desired. Generally, in reactions with a non-solvent or in reactions without a liquid medium, the reaction time is short, about one hour. This is due primarily to the high concentration of reactants. In the event a solvent is used, the concentration of the reactants and catalyst is lowered and thus the overall reaction rate is retarded.

The folloying table illustrates the effect of solvent, nonsolvent and no solvent on the reaction time for preparing dimer:

TABLE I.—EFFECT OF LIQUID MEDIA ON REACTION TIME IN FORMATION OF DIMER

| Medium | Medium/ PABA[1] ml./l. mol | Reaction time, hour | Mole ratio | | | Temperature, °C. |
|---|---|---|---|---|---|---|
| | | | PABA[1] | SOCl₂ | DMAc[2] | |
| None | 0 | <1 | 1 | 1 | 1 | 30 |
| Solvent, CH₂Cl₂ | 1,000 | 16 | 1 | 1 | 1 | 30 |
| | | | | | | 50% conversion |
| Do | 300 | 6 | 1 | 1 | 1 | 30 |
| Do | 125 | 2 | 1 | 1 | 1 | 30 |
| Non-solvent, hexane | 480 | 1.3 | 1 | 1 | 1 | 33 |
| Non-solvent, benzene | 650 | <0.75 | 1 | 1 | 1 | 50 |
| Do | 650 | 2 | 1 | 1 | 0.5 | 50 |
| Do | 650 | 4.3 | 1 | 1 | 0.1 | 50–70 |

[1] PABA is p-aminobenzoic acid.
[2] DMAc is N,N-dimethylacetamide.

The above table illustrates the effect of the reaction medium and quantity thereof on the reaction rate, as well as the effect of the base compound concentration, N,N-dimethylacetamide, on the reaction rate.

The reaction rates and overall reaction time are easily determined by following the rates of disappearance of p-aminobenzoic acid and appearance of the product by employing infrared spectroscopy.

The process for dimer and/or oligomer can be conducted batch-wise or in a continuous manner.

If operated on a continuous basis, the reactants, p-aminobenzoic acid, thionyl chloride and base compound, are fed continuously into a stirred tank at a temperature below about 5° C. The reaction mass overflows into another tank maintained at a temperature of about 5° C. to 95° C., depending on the product desired. After completion of reaction, the reaction mass is spray dried to remove by-product sulfur dioxide. The reaction mass may contain dimer and/or oligomer, depending uopn the reaction conditions, in admixture with the base hydrochloride. The product in admixture with the base hydrochloride can be polymerized or the base hydrochloride separated, as described herein.

In addition to providing a novel process for the preparation of active polymerizable substances, high molecular weight p-benzamide polymers are also prepared. For example, when the reaction involving p-aminobenzoic acid with thionyl chloride is conducted in the presence of 3 to 30 moles of the base compound, high molecular weight p-benzamide polymers may be obtained directly without any purification procedures involving intermediates produced. This is accomplished by the addition of water or a water precursor to the reaction mass subsequent to the formation of p-thionylaminobenzoyl chloride. The reaction mixture is then agitated and a neutralization agent is added. In some cases the neutralizing agent serves as the water precursor. Sulfur dioxide is formed as a by-product of the reaction. The resulting high molecular weight p-benzamide polymer is in the form of a fluid composition, which after filtration may be spun directly into fibers.

By water precursor is meant a basic compound which forms water or reaction with HCl, such as an alkali metal or alkaline earth metal hydroxide, oxide or carbonate. Representative examples of a water precursor include lithium carbonate, lithium oxide and lithium hydroxide.

The amount of water precursor used is that amount which will provide water in amounts equivalent to the molar amount of p-aminobenzoic acid used initially.

Representative examples of neutralization agents include the alkali metal and alkaline earth metal hydroxides, oxides, carbonates and hydrides, such as calcium hydroxide, lithium oxide, sodium carbonate, lithium hydride and ammonium hydroxide. Lithium is the preferred cation.

When the neutralization agent is a lithium base, lithium chloride is formed which serves to increase the polymerization rate and to produce polymers of higher inherent viscosity.

The sulfur dioxide that forms as a by-product of the reaction is desirably removed. Absorbents may be conveniently used for this purpose. Such absorbents include molecular sieves of alkali metal aluminosilicates having a network of empty pores and cavities.

In addition to the process described above for the preparation of high molecular weight p-benzamide polymers, this invention also provides another direct route for obtaining spin dopes of the p-benzamide polymers. This is accomplished by the direct addition of a polymerization solvent after removal of the by-product sulfur dioxide to the reaction product containing the dimer and/or oligomer and base hydrochloride. A neutralization agent is then added. The polymerization solvents are not the solvents cited hereinbefore.

Representative examples of the polymerization solvents of this invention include N,N,N',N'-tetramethylurea; 1,3 - dimethylimidazolidinone - 2; N - methylpiperidone-2; N - methylcaprolactam; N,N - dimethylpropionamide; N,N - dimethylbutyramide; N,N - dimethylisobutyramide; hexamethylphosphoramide; N,N - dimethylacetamide; N-methylpyrrolidone - 2; N - ethylpyrrolidone - 2, N,N-diethylacetamide; N,N,N',N'-tetramethylmalonamide; and the like, or mixtures thereof.

A neutralizing agent such as lithium carbonate, lithium hydroxide, lithium oxide or calcium hydroxide is preferably added to the reaction mixture in the amount necessary to effect neutralization of the acidic by-product. This neutralization is highly desirable for several reasons. Firstly, the acid may cause significant corrosion problems in processing equipment (e.g., the spinneret). Secondly, it is seen that the presence of acid may inhibit formation of higher molecular weight polymer (e.g., inherent viscosity greater than about 1.5 to 2.0). When a lithium base neutralization agent is used, lithium chloride is formed which solubilizes the polymer and permits the formation of a spin dope solution of the polymer.

The reaction mixture preferably will contain from 1 to 10% dissolved lithium chloride with 1 to 4% being most preferred.

When polymerization solvents such as tetramethylurea, N,N - dimethylacetamide, N,N - dimethylisobutyramide, or 1,3 - dimethylimidazolidinone - 2, are employed in the polymerization, the contents of the reaction vessel are obtained in the form of a viscous dope which can be directly formed into shaped articles (e.g., extruded into fibers or cast into films). Under these conditions, use of calcium hydroxide as a neutralizing agent is limited to N,N - dimethylacetamide dopes. It is generally preferred to further stir the contents of the reaction vessel, after neutralization, for about 0.5 to 2 hours, at from 45 to 170° C., when the polymerization solvent is tetramethylurea. When the polymerization solvent is 1,3 - dimethylimidazolidinone - 2, N,N - dimethylisobutyramide or N,N - dimethylacetamide, it is preferred to further stir the contents of the reaction vessel, after neutralization for about 1 hour, at about 100 to 110° C. for obtaining a more fluid spin dope.

The following examples further illustrate the invention.

EXAMPLE 1

Dimer preparation using solvent, $CH_2Cl_2$

A slurry of p-aminobenzoic acid (27.4 g., 0.20 mole) in methylene chloride (50 ml.) was cooled to —5° with stirring, in a round bottom. 4-necked flask equipped with stirrer, thermometer, nitrogen inlet and dropping funnel. Thionyl chloride (26.0 g., 0.218 mole was rapidly added followed by dry N,N - dimethylacetamide (17.4 g., 0.20 mole). The latter was added in 20 min. between —5 and 2°. The temperature was allowed to rise to 30–35° for a period of 3 hours. An additional portion of methylene chloride (100 ml.) was added and the reaction was then brought to reflux (42°) and held at reflux for 1 hour. The reaction mixture was cooled, transferred to a dry box and filtered. After washing the filter cake with methylene chloride (400 ml.), the product was dried by drawing a stream of nitrogen through the cake. The yield was 28.9 g., 0.0928 mole (92.8%). This product had the following C, H, N, S, Cl, O analysis.

Found (percent): C, 52.03, 52.10; H, 3.94, 4.29; N, 8.75; S, 0.00; Cl, 22.41, 22.24; O, 11.28, 11.14. Calcd. for $C_{14}H_{12}N_2O_2Cl_2$(311.17) (percent): C, 54.05; H, 3.89; N, 9.00; O, 10.28; Cl, 22.79; S, 0.00.

A small portion of the above reaction mixture was refluxed in methanol, poured onto ice water and made basic with dilute sodium hydroxide solution. The precipitate was collected and dried. An I.R. spectrum of this methyl ester derivative was substantially identical to that of N - (4' - carbomethoxyphenyl) - 4 - aminobenzamide prepared by another unambiguous route, thus establishing that the product obtained was 4 - (4' - aminobenzamido) benzoyl chloride hydrochloride. The I.R. spectrum also showed a small absorption at 1650 cm.$^{-1}$ indicating a small amount of oligomeric product (8%).

EXAMPLE 2

Preparation of polymer from dimer 4-(4'-aminobenzamido)benzoyl chloride hydrochloride prepared essentially as in Example 1, was polymerized and wet spun into fiber.

4-(4'-aminobenzamido)benzoyl chloride hydrochloride 46.65 g. was added to 321 ml. of anhydrous N,N-dimethylacetamide previously cooled to —10° C. in a 500 ml. resin kettle equipped with a drying tube, nitrogen inlet and an air driven stirrer. The mixture was stirred in an ice bath for 4 minutes then in a 20° water bath for 50 minutes.

The resulting thick paste was cooled in an ice/methanol bath and 10.77 g. of lithium chloride added. A clear solution resulted which was stirred overnight at room temperature. A small sample of the solution was drowned in water, collected by filtration and washed well with water. The isolated poly-p-benzamide had an inherent viscosity of 2.1. The polymer solution was then spun into fiber having $T/E/M_i$ of 6.9/5.5/352.

EXAMPLE 3

Preparation of polymer from dimer in admixture with base hydrochloride 4-(4'-aminobenzamido)benzoyl chloride hydrochloride isolated as a mixture with N,N-dimethylacetamide hydrochloride was prepared and the mixture polymerized to poly-p-benzamide. The poly-p-benzamide was spun into fiber.

4-(4-aminobenzamido)benzoyl chloride hydrochloride was prepared essentially as in Example 1 but was not isolated by filtration. The reaction mixture containing N,N-dimethylacetamide hydrochloride was cooled to 5° and the flask fitted with a distillation head. The receiver flask was cooled to —80° in a Dry Ice/acetone bath. The methylene chloride, sulfur dioxide and excess thionyl chloride were removed by vacuum distillation at 20 mm. Hg. When the residue solidified, the stirring was stopped and the residue was allowed to warm to room temperature. The vacuum was increased to 0.3 mm. Hg for 3 hours and then released under nitrogen. The partially dried product mixture was removed from the flask in a dry box and placed in a vacuum dessicator and the drying was finished at 1 mm. Hg pressure overnight. The dried product was ground to a fine powder in a blender under a nitrogen cover. A yield of 97.0% (108.2 g.) of mixture was obtained which consisted essentially of 4-(4'aminobenzamido)benzoyl chloride hydrochloride and N,N-dimethylacetamide hydrochloride in a 1:2 molar ratio. The product contained 3.38% oligomer as determined by I.R. analysis.

108.2 grams of the product mixture was added to 800 ml. of anhydrous N,N-dimethylacetamide previously cooled to —12° in a 1 liter resin kettle fitted with a nitrogen inlet and a stirrer. The mixture was stirred and slowly warmed to 10° over 1.5 hours. The temperature was held at 10° for 50 min. and then allowed to rise to 25°. The reaction mixture was treated with 24.5 g. of lithium carbonate. The mixture was stirred until a solution formed. A sample of the resulting poly-p-benzamide solution was drowned in water. The isolated polymer had an inherent viscosity of 2.39. The solution was spun into fiber with $T/E/M_i$ of 9.5/6.1/415.

EXAMPLE 4

Preparation of dimer in solvent medium of $CH_2Cl_2$

A 4-liter resin flask equipped with air motor stirrer, condenser, thermometer and nitrogen inlet tube (for maintaining a nitrogen atm. over the reaction) was charged with 548 g. (4.0 moles) of p-aminobenzoic acid and 1180 ml. of $CH_2Cl_2$. To this stirred slurry was added 370 ml. (4.0 moles) of N,N-dimethylacetamide over a period of two minutes. The mixture was cooled to 5° C. and 316 ml. (4.4 moles) of $SOCl_2$ was added over a period of 10 minutes while maintaining the temperature below 25° C. The resulting thick slurry was then heated to 35° and stirred at that temperature for 5 hours after which the heat source was removed.

During a 1-minute period, 800 ml. of 1,1,2-trichlorotrifluoroethane was added to the reaction mixture followed by stirring for 15 minutes. Stirring was stopped for three minutes, during which time the solids in the reaction vessel floated to the top of the liquid. Then 1100 ml. of the mixed solvents were siphoned from the vessel over a two minute period, and 1000 ml. of additional 1,1,2-trichlorotrifluoroethane was added with stirring for 10 minutes. During this period the reaction mass (originally of curd-like consistency) broke up into fine solid grains. This solid was collected and dried under $N_2$ pressure overnight, giving 1079 grams of product in a 96.9 yield percent. Analysis of the product showed 25.48 wt. percent HCl, indicating about 1 equivalent of N,N-dimethylacetamide hydrochloride per equivalent of polymerizable product. I.R. analysis of the polymerizable portion of the product indicated 9% oligomer, the remainder being dimer. Polymerization of the product in the usual manner gave a polymer with an inherent viscosity of 3.10.

EXAMPLE 5

Preparation of dimer in non-solvent, hexane

A mixture of 54.8 g. (0.40 mole) p-aminobenzoic acid and 200 ml. hexane was stirred in a round bottom, 4-necked flask equipped with stirrer, thermometer, nitrogen inlet and dropping funnel, and cooled under a nitrogen cover. Dry N,N-dimethylacetamide (34.8 g., 0.40 mole) was added and the slurry was cooled to —2° C. Thionyl chloride (49.8 g., 0.41 mole) was added over 10 minutes, causing the temperature to rise to 14° C. The temperature was increased to 33° C. in 27 minutes and held at this temperature for 50 minutes. During this time the slurry had coagulated into a gummy mass and the temperature was increased to 50°. This caused rapid gas evolution and the mass broke up into small hard fragments. The reaction mixture was cooled to 25° C., the product collected by filtration, washed with dry ether and dried with a nitrogen stream. The product, 105.6 g., (0.384 equiv., 95.9% based on an equiv. wt. of 275.3 g./equiv.) consisted of 52 grams 4-(4'-aminobenzamido)benzoyl chloride hydrochloride, 47.4 grams N,N-dimethylacetamide hydrochloride and 6.2 grams oligomer.

A sample of the mixture of 4-(4'-aminobenzamido) benzoyl chloride hydrochloride and N,N-dimethylacetamide hydrochloride 1:1 ratio of equivalent of polymerizable product: equivalent base hydrochloride was polymerized in N,N-dimethylacetamide as described in Example 3. The polymer obtained had an inherent viscosity of 1.68.

EXAMPLE 6

Preparation of dimer (no solvent)

13.7 grams of p-aminobenzoic acid (0.10 mole) and 13.1 g. of thionyl chloride (0.11 mole) were combined in a round bottom, 4-necked flask equipped with thermometer, stirrer, nitrogen inlet and dropping funnel. The temperature rose to 30° C. and the originally dry mixture became a thick but stirrable slurry. The temperature was lowered to −5° C. and 8.7 g. (0.1 mole) of N,N-dimethylacetamide was added in 6 minutes below 8° C. The temperature was allowed to rise to 31° C. and the slurry became easily stirrable. By maintaining the temperature at 30° C. for 30 minutes, the reaction was completed. The reaction mass was maintained at 27–30° C. for another 30 minutes, then swept with nitrogen for 2 hours. The yield was 24.9 g. (90.6% [1]) consisting of 12.1 g. dimer, 1.62 g. oligomer and 11.18 g. N,N-dimethylacetamide hydrochloride in a 1:1 equivalent ratio of polymerizable product to base hydrochloride.

The product of the above Example 6 was polymerized. The polymer had an inherent viscosity of 1.58.

Alternatively, the N,N-dimethylacetamide may be added to the thionyl chloride, as shown in the following Example 7.

EXAMPLE 7

Preparation of dimer (PABA added last)

To a jacketed resin flask equipped with an agitator, 119.8 g. (1.1 moles) of thionyl chloride was added and cooled to 0° C. N,N-dimethylacetamide, 87 g. (1 mole) was added while maintaining the mixture below 5° C. To this mixture was added 137 g. (1 mole) of p-aminobenzoic acid keeping the temperature below 12° C. The system was maintained at a slight positive pressure (100–300 mm. Hg above atmospheric) with nitrogen to prevent loss of $SO_2$ which is formed in the reaction. The mixture was heated slowly to 30°–35° C. and held at this temperature for 15–30 minutes. During this entire time the reaction mass remained in the form of a thin slurry. When the reaction was completed, the product was converted to a dry powder (420 g.) by purging with dry nitrogen. Product contained 186 g. of N,N-dimethylacetamide hydrochloride and the remaining 234 g. consisted of 73% dimer and 27% oligomer as determined by I.R. spectroscopy.

If in the reaction as described above, the reaction mass thickens prematurely, additional $SO_2$ may be added to the reaction mass. By attaching a cooled reflux condenser to the apparatus, the $SO_2$ is condensed and the reaction mass maintained in the form of a thin liquid slurry. Up to 4 additional moles of $SO_2$ may be advantageously added when the temperature is kept at −2° or at a higher temperature under pressure. The product is recovered as a dry powder, as described above, by purging the reaction mass with dry nitrogen at a fast rate, or it can be spray dried in conventional spray drying equipment.

---

[1] Based on an equivalent weight of 274.9 grams/equivalent.

EXAMPLE 8

Preparation of a spin dope

A 3-necked, 500 ml. round bottom flask was flame dried and after cooling was fitted with a nitrogen inlet, stirrer and a dropping funnel. p-Aminobenzoic acid, 13.7 g., 0.10 mole, and thionyl chloride, 12.5 g., 0.105 mole, were combined and stirred in the flask, which was cooled in an ice-acetone bath (−15°). A thermometer was fitted into the nitrogen inlet adapter. When the mixture reached −2°, N,N-dimethylacetamide, 8.7 g., 0.10 mole, was added dropwise over 8 minutes. The bath was removed and the reaction mixture was allowed to warm to 27° and maintain at 27° for one hour. A sample was removed for I.R. analysis which showed the reaction was complete, 88.1 equiv. percent dimer and 11.9% equiv. percent oligomer.

The flask was then sealed and evacuated to 0.2 mm. Hg. After 1.25 hours the vacuum was released under nitrogen and the flask transferred to a dry box. The dried solids were pulverized under a nitrogen sweep. The reaction was cooled in an ice-acetone bath and 188 g. N,N-dimethylacetamide was added at −10°. The slurry was allowed to warm to 19° over 25 minutes. The reaction mixture was cooled to 7° and $Li_2CO_3$ was added in 2 minutes with a temperature rise of 2°. The cooling bath was removed and the temperature allowed to rise to 20° over an 18 minute period. The stirring was continued at this temperature for one hour and the solution was allowed to stand overnight. Fiber spun from the solution had the following properties: Tenacity 6.1, Elongation 5.4, Initial Modulus 394, and Denier 129.

A 20 ml. sample was withdrawn, drowned in 200 ml. water and stirred in a blender. After collecting the polymer by filtration, it was reblended twice more with water. The washed polymer was dried in a vacuum oven at 90° for 4 hours. The inherent viscosity of the polymer was 1.77.

EXAMPLE 9

Preparation of dimer using p-aminobenzoic acid hydrochloride as starting material A mixture of 34.7 g. (0.20 mole) p-aminobenzoic acid hydrochloride, 90 ml. hexane and 17.4 g. (0.20 mole) N,N-dimethylacetamide was stirred under nitrogen in a round bottom, 4-necked flask equipped with thermometer, stirrer nitrogen inlet and dropping funnel, cooled and 24.4 g. (0.205 mole) thionyl chloride was added, keeping the temperature below 5° C. in 7 minutes. The reaction was slowly warmed to 50° C. and maintained at that temperature for 1.5 hours with stirring. The reaction mixture was cooled and I.R. spectra showed the polymerizable product to be primarily 4-(4'-aminobenzamido)benzoyl chloride hydrochloride (87.2%) and a small amount of oligomer (12.8%).

EXAMPLE 10

Preparation of dimer using pyridine as base compound 4-(4'-aminobenzamido)benzoyl chloride pyridine hydrochloride was prepared by substituting pyridine for N,N-dimethylacetamide in Example 1.

54.8 grams (0.40 mole) of p-aminobenzoic acid, 31.6 g. (0.40 mole) of pyridine, 400 ml. of methylene chloride and 49.0 g. (0.412 mole) of thionyl chloride were combined as in Example 1 and stirred for 22 hours at ambient temperature. The product was collected by filtration, washed with 750 ml. methylene chloride and dried in a desiccator at 10 mm. Hg pressure. The yield of dry product was 72.0 g. (84.4%), containing 52.5 g. dimer (0.0338 equivalent) and 19.5 g. pyridine hydrochloride (0.0169 equivalent).

*Analysis.*—Calc. for $C_{19}H_{18}N_3O_2Cl_3$ (percent) (M.W. 426,733): C, 53.55; H, 4.26; N, 9.85; O, 7.51, Cl, 24.93. Found (percent): C, 54.08, 54.18; H, 4.24, 4.16; N, 9.66, 9.67; O, 7.79, 7.91; Cl, 23.99, 24.11.

A portion of this product having a ratio of 1 equivalent of dimer to 0.50 equivalent of pyridine hydrochloride was polymerized essentially as in Example 3. The isolated poly-p-benzamide had an inherent viscosity of 1.66.

EXAMPLE 11

Preparation of oligomer-low temperature,
2 moles of base/mole PABA

A slurry of 27.4 g. (0.20 mole) of p-aminobenzoic acid, 24.8 g. (0.210 mole) thionyl chloride and 50 ml. methylene chloride was cooled to —7° and 34.8 g. (0.40 mole) of N,N-dimethylacetamide was added over 30 minutes keeping the temperature below 1°. The temperature was allowed to rise to ambient and the slurry was stirred for 21 hours. Another 1.2 g. (0.01 mole) of thionyl chloride was added and the slurry stirred for another 24 hours. The product was collected by filtration, washed with methylene chloride and dried with a stream of nitrogen. The I.R. spectrum of the product showed little or no 4-(4'-aminobenzamido)benzoyl chloride hydrochloride but instead oligomeric acid chloride amine hydrochloride. This oligomeric product had an average of 10–30

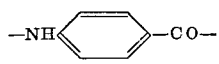

groups. The yield was 30.4 g., which contained 24.87 g. oligomer, 3.64 g. N,N-dimethylacetamide hydrochloride and 1.89 g. $SO_2$. A sample was polymerized essentially as described in Example 3. The isolated poly-1,4-benzamide had an inherent viscosity of 1.54.

An oligomeric product can be also obtained in a shorter time using a higher temperature and a lower ratio of dimethylacetamide as shown in Example 12.

EXAMPLE 12

Oligomer preparation-high temperature,
1 mole of base/1 mole PABA

A slurry of 27.4 g. (0.20 mole) of p-aminobenzoic acid and 17.4 g. (0.20 mole) of N,N-dimethylacetamide in 130 ml. benzene was stirred and cooled under nitrogen to 5° C. Thionyl chloride (24.4 g., 0.205 mole) was added which raised the temperature from 5° to 24° C. The temperature was raised to 70° in 33 minutes and after heating at 70° C. for a total of 50 minutes an examination by I.R. of the solids washed free of N,N-dimethylacetamide hydrochloride showed essentially oligomeric material. The mixture was cooled, filtered and the cake dried. The yield obtained was 47.9 g., 95.7%, containing 24.20 g. oligomer and 23.70 g. N,N-dimethylacetamide hydrochloride.

A sample of the product was polymerized to give a polymer having an inherent viscosity of 1.90. Fibers spun from the resulting polymer had the following properties: T, 9.1; E, 5.1; $M_i$, 565.

EXAMPLE 13

Oligomer preparation-medium temperature,
2 moles base/1 mole PABA 137.1 g. (1 mole) of p-aminobenzoic acid, 650 ml. benzene and 125 g. (1.05 moles) of thionyl chloride were mixed and stirred under nitrogen. N,N-dimethylacetamide (170 g., 1.95 moles) was added at about 40° C. in 11 minutes. The temperature was then raised to 52°–60° and maintained in that range for 2 hours, 40 minutes. Another portion of thionyl chloride (16.5 g., 0.139 mole) was added and the reaction mixture stirred another hour before cooling to 25° C. The product was collected and dried under nitrogen. The yield was 310 g., 83.9% based on an equiv. wt. of 369.4 g./equiv. The I.R. spectrum of a sample of the final product after washing out N,N-dimethylacetamide with methylene chloride showed 93.4% (99.2 g.) oligomer, and 8.55 g. of dimer.

Alternatively, the oligomer was also obtained by reacting 137.1 g. (1 mole) of p-aminobenzoic acid with 125 g. (1.05 moles) of thionyl chloride as described in Example 10, but initially with a lesser amount of N,N-dimethylacetamide (43.5 g., 0.50 mole). After the reaction mixture had been maintained at 55° C. for about 1.5 hours when an I.R. spectrum showed the product to be mainly the dimer and a small amount of oligomer, an additional portion of N,N-dimethylacetamide (74.0 g., 0.85 mole) was added over 13 minutes at 55°–58° C. The temperature was maintained at 55° for 1 hour then lowered to 25° C.

The product mixture was filtered and dried with a stream of nitrogen. The yield was 280.8 g. A portion of the product after washing with $CH_2Cl_2$ (removed N,N-dimethylacetamide·HCl) and examined by I.R. showed that about 73.8% of the dimer had been converted to oligomer. The weight percent of N,N-dimethylacetamide in the final total product was 37.0%. Thus the product consisted of 92.7 g. oligomer, 40.5 g. dimer and 147.6 g. of N,N-dimethylacetamide hydrochloride. The product was polymerized giving an inherent viscosity of 0.94.

EXAMPLE 14

Absence of base 27.4 grams (0.20 mole) of p-aminobenzoic acid was stirred with 130 ml. benzene in a round bottom, 4-necked flask equipped with a thermometer, stirrer, dropping funnel and nitrogen inlet. The mixture was cooled to 5° C. and 24.4 g. (0.205 mole) of thionyl chloride added. The mixture was heated to 50° C. for 1.25 hours. An I.R. spectrum of the methylene chloride insoluble solids showed only the presence of the starting material and its hydrochloride. The temperature was increased to reflux, about 80° C. After 1 hour, the I.R. spectrum showed primarily p-aminobenzoic acid hydrochloride and a little p-aminobenzoic acid. One ml. of thionyl chloride and 50 ml. of benzene were added and the refluxing continued overnight (18 hr.). An I.R. spectrum showed that an oligomeric product had formed together with other products and that p-aminobenzoic acid hydrochloride still remained. After an additional 3 hr. of reflux, p-aminobenzoic acid hydrochloride was still present.

The dimer is not a product under these conditions, the reaction does not go to completion, side reactions occur forming other by-products and the small amount of oligomer of p-aminobenzoyl chloride which had formed would necessarily have to be purified before it could be polymerized.

EXAMPLE 15

Preparation of dimer using benzene-medium low temperature 35° dimer preparation

A 5-liter flask equipped with mechanical stirrer, dropping funnel, thermometer, reflux condenser and nitrogen inlet was charged with 686 g. (5.0 moles) of p-aminobenzoic acid and 3250 ml. of benzene. This stirred slurry was cooled to 5° C. and 218 g. 2.50 moles) of N,N-dimethylacetamide was added over a 16-minute period. Then 655 g. (5.50 moles) of $SOCl_2$ was added over a 2-minute period while maintaining the temperature below 10° C.

The cooling bath was removed and the stirred slurry was heated to 35° C. for 1 hour. Then a nitrogen purge was introduced through the reaction flask over the top of the reaction mixture (flow rate ca. 400 cc./min.). Stirring at 35° with the nitrogen purge was continued for 16.5 hours (i.e., total reaction time at 35° was 17.5 hours). The heat source was removed; the product was collected and dried under nitrogen pressure overnight, giving 1016 g., 94.6% yield of theoretical. This product was mostly dimer containing 8.0% oligomer.

The product having a ratio of 1 equivalent of polymerizable product to 0.05 equivalent of N,N-dimethylacetamide·HCl was polymerized in the usual manner to give a polymer having an inherent viscosity of 5.73.

TABLE II.—VARIOUS REACTANTS AND CONDITIONS

[1 mole p-aminobenzoic acid:1 mole thinoyl chloride [1]:X mole base]

| | | | | | | | | | | Product Composition, grams/equivalent | | | | |
|---|---|---|---|---|---|---|---|---|---|---|---|---|---|---|
| Exp. No. | Base | X Mole | Medium/ml. | Last reagent added | Scale | Reaction temp., °C.[4] | Reaction time, hr. | Yield, grams[5] | Equiv. weight[6] | Dimer | Oligomer | Base·HCl | Yield, percent[7] | Inherent viscosity of polymer |
| 16 | DMAc[2] | 1 | CCl₂FCClF/2437 | SOCl₂ | 1.56 | 25-37 | 20 | 421.0 | 269.7 | 164.8/0.059 | 63.4/0.501 | 192.8/1.560 | 97.5 | 0.97 |
| 17 | DMAc | 1 | Glyme/450 | SOCl₂ | 1.00 | 50 | 1.3 | (8) | | | [3] 64.2% | | (8) | |
| 18 | DMAc | 1 | Tetraglyme/375 | SOCl₂ | 1.00 | 25 | 20 | (8) | | | [3] 47.5% | | (8) | |
| 19 | DMAc | 0.5 | Benzene/650 | DMAc | 5.00 | 40-70 | 2.5 | 1,058.0 | 212.0 | 660.0/4.25 | [3] 91.7/0.725 | 306.3/2.487 | 99.9 | 2.84 |
| 20 | Trimethylamine | 0.1 | Benzene/650 | SOCl₂ | 1.00 | 20 | 20 | (8) | | | [3] 33.5% | | (8) | |
| 21 | Hexamethylphosphoramide | 1 | CH₂Cl₂/500 | SOCl₂ | 1.00 | 25-30 | 21 | (8) | | | [3] 24.0% | | (8) | |
| 22 | Hexamethylphosphoramide | 1 | CH₂Cl₂/260 | Hexamethylphosphoramide | 0.20 | 25-30 | 3 | 65.5 | 367.4 | 24.1/0.155 | 2.93/0.0232 | 38.4/0.1782 | 89.1 | 0.70 |
| 23 | Tetramethylurea | 1 | CH₂Cl₂/260 | Tetramethylurea | 0.20 | 25-30 | 3 | 45.2 | 303.7 | 20.6/0.1323 | 2.09/0.0165 | 22.54/0.1488 | 74.4 | 1.49 |
| 24 | DMAc | 1.95 | Benzene/650 | DMAc | 1.00 | 55-65 | 3 | 318.3 | 370.2 | 13.5/0.087 | 101.2/0.800 | 218.0/1.730 | 88.7 | 2.6 |
| 25 | γ-Picoline | 0.5 | Benzene/650 | SOCl₂ | 1.00 | 55-60 | 5 | 220 | (8) | | (8) | | 90.3 | 1.69 |
| 26 | N-methyl caprolactam | 0.5 | Benzene/650 | α-Picoline | 1.00 | 60 | 3 | 419 | (8) | | | | 88.2 | |
| 27 | α-Picoline | 0.5 | Benzene/650 | α-Picoline | 0.20 | 75 | 1 | (8) | | | [3] 21.5% | | | [9]1.88/1.27 |
| 28 | N-methyl acetamide | 1.0 | CH₂Cl₂/650 | N-methyl acetamide | 0.20 | 25-30 | 24 | 35.7 | 262.5 | 20.0/0.129 | 0.89/0.007 | 14.75/0.136 | 68.0 | 1.28 |
| 29 | DMAc·HCl | 1.0 | CH₂Cl₂/650 | SOCl₂ | 0.20 | 30-40 | 24 | 47.9 | 270.1 | 18.97/0.1219 | 7.0/0.0553 | 21.9/0.1772 | 68.6 | 2.35 |
| 30 | N-methyl pyrrolidone-2 | 1.0 | CH₂Cl₂/650 | N-methyl pyrrolidone-2 | 0.20 | 25-30 | 20 | 54.8 | 293.0 | 2.92/0.1870 | 7.0/0.0553 | 25.6/0.1870 | 93.6 | 2.03 |

[1] A slight excess varying from 2-10% was used.
[2] DMAc=N,N-dimethylacetamide.
[3] Oligomer as determined by I.R. spectra.
[4] Addition of reagents normally carried out at about 10° C.
[5] Includes polymerizable product+base·HCl.
[6] Calculated on the basis of a decamer, equiv. wt. 126.5 g./equiv.
[7] Yield of polymerizable product based on theoretical.
[8] Not available.
[9] Two fractions obtained on polymerization.

EXAMPLE 31

Direct preparation of polymer

A three-necked round bottom flask equipped with thermometer, mechanical stirrer, dropping funnel and nitrogen inlet was charged with 34.25 g. (0.25 mole) of p-aminobenzoic acid and 330 g. (3.8 moles) of N,N-dimethylacetamide under a nitrogen atmosphere. This solution was cooled to 5° C. and 54 g. (0.50 mole) of thionyl chloride was added over a period of 40 minutes at 5°–10° C. After an additional 20 minutes at 5° C., a solution of water (4.5 g., 0.25 mole) in N,N-dimethylacetamide (141.5 g., 1.62 moles) was added over a period of 50 minutes at 6°–10° C. Stirring was continued for an additional two hours at 5°–10° C. Then the cooling bath was removed, the mixture was allowed to warm to room temperature (approx. 1 hr.), and lithium carbonate (37.5 g., 0.5 mole) was added portionwise over a period of 30 minutes at 20–25° C. After stirring for an additional 30 minutes at room temperature, a sample was removed and the polymer was isolated by precipitation in, and washing with excess water in a blender. The polymer was dried at 90° C. in a vacuum oven under a nitrogen purge. The inherent viscosity ($N_{inh}$) of the polymer was 1.15.

EXAMPLE 32

Direct preparation of polymer with removal of N,N-dimethylacetamide hydrochloride.

p-Aminobenzoic acid (34.25 g., 0.25 mole) and N,N-dimethylacetamide (330 g., 3.8 moles) were combined in a vessel as in Example 31 and the thionyl chloride (54 g., 0.50 mole) was added over a period of 20 minutes at 20° C. Stirring was then continued at 20° C. for 30 minutes. The reaction mixture was cooled to −10° C. and the precipitated N,N-dimethylacetamide hydrochloride (0.44 mole) was removed by filtration. This operation was performed in a dry box. The filtrate was returned to the reaction vessel, warmed to 10° C., and a solution of water (4.5 g., 0.25 mole) in N,N-dimethylacetamide (141.5 g., 1.62 moles) was added over a period of one hour. Stirring was continued for two hours at 10° C. and one hour at 25° C. Lithium carbonate (21.9 g., 0.283 mole) was added portionwise at 25° C. over a period of 30 minutes. After an additional reaction period of 30 minutes at 25° C., a portion of the polymer was isolated as in Example 31. The $N_{inh}$ of the polymer was 0.99.

EXAMPLE 33

Direct preparation of polymer spin dope p-Aminobenzoic acid (34.25 g., 0.25 mole) and N,N-dimethylacetamide (330 g., 3.8 moles) were combined in a vessel as in Example 31 and the thionyl chloride (54.0 g., 0.50 mole) was added over a period of 20 minutes at 20°. Stirring was continued for 30 minutes at 20°. The reaction mixture was cooled to −10° and the precipitated N,N-dimethylacetamide hydrochloride (0.499 mole) was removed by filtration as in Example 32. The filtrate was returned to the reaction vessel and was stirred for 1.5 hours at 10° C. The reaction mixture was cooled to −5° and a solution of water (9.0 g., 0.25 mole) in N,N-dimethylacetamide (141.5 g., 162 moles) was added over 50 minutes below 0°. The reaction mixture was stirred for 1 hour at 0° then warmed to 20° over a period of 1 hour. Lithium carbonate (18.47 g., 0.25 mole) was then added as in Example 2. A portion of the polymer was isolated, as in Example 1, 15 minutes after the neutralization. The $N_{inh}$ was 0.76. The spin dope was spun into a fiber.

TABLE I.—DIRECT POLYMERIZATION OF p-AMINOBENZOIC ACID [1,a]

| Example | PABA[1] (mole) | DMA[2] (ml.) | SOCl₂ addition | | SOCl₂ (mole) | Reaction period before H₂O addn. | | H₂O addition | | Reaction period before Li₂CO₃ addn. | | Li₂CO₃ addn. | | Reaction period Li₂CO₃ addn. | | DMAc·HCl removed (mole) | Polymer η_inh |
|---|---|---|---|---|---|---|---|---|---|---|---|---|---|---|---|---|---|
| | | | Temp. (°C.) | Time (hr.) | | Temp. (°C.) | Time (hr.) | Temp. (°C.) | Mole | Temp. (°C.) | Time (hr.) | Temp. (°C.) | Mole | Temp. (°C.) | Time (hr.) | | |
| 34 | .05 | 100 | -20-26 | .25 | .10 | -5-0 | 2.0 | -5 | .045 | 17 | 1.5 | 17 | .075 | 25 | .5 | ------ | .73 |
| 35 | .25 | 500 | 20 | .33 | .50 | 20 | .50 | 0 | .25 | 20 | 3.0 | 20 | .50 | 25 | .5 | ------ | .84 |
| 36 | 1.00 | 2,000 | 10 | 1.50 | 2.00 | -2 | 1.0 | ---- | ---- | -2 | 1.0 | -2 | 1.00 | 25 | 2.0 | 2.50 | .73 |
| 37 | .75 | 2,000 | 5 | .67 | 1.50 | 5 | 1.0 | ---- | ---- | -2 | 1.0 | -2 | .75 | 25 | 3.0 | 1.60 | .70 |

[1] p-Aminobenzoic acid.
[2] N,N-dimethylacetamide.
[3] Examples 34 and 35 were run in the same manner as Example 31, wherein no DMAc·HCl was removed prior to addition of water and neutralization.
[4] Examples 36 and 37 were run in the same manner as Example 32, wherein DMAc·HCl was removed, but both differ from Example 32 in that no water was added prior to neutralization. Water generated from neutralization (2 HCl+Li₂CO₃→2 LiCl+CO₂+H₂O) in these cases converts the intermediate thionylaminobenzoyl chloride ultimately to polymer.

EXAMPLE 38

Preparation of polymer from p-aminobenzoic acid using molecular sieves p-Aminobenzoic acid (34.30 g., 0.25 mole) was dissolved in N,N-dimethylacetamide (450 ml.) in a 1 l. resin kettle equipped with dropping funnel, nitrogen inlet, stirrer, drying tube and thermometer, and the solution cooled to 5° C. Thionyl chloride (59.50 g, 0.50 mole) was added dropwise over about 50 minutes while maintaining the temperature of the reaction mass at 4-10° C. During the thionyl chloride addition, a yellow precipitate (N,N-dimethylacetacide·HCl) formed. The mixture was stirred at 5° C. for 15 minutes, 200 g. molecular sieves (sodium zeolite of 4 Angstrom units pore diameter) were added and stirring continued for 15 minutes. Water (4.50 g, 0.25 mole) in N,N-dimethylacetamide (50 ml.) was added over 30 minutes, maintaining the temperature at 5-10° C. The cooling bath was removed and the mixture stirred for an additional 1.5 hours. The mixture was cooled to 10° C. and lithium hydride (3.97 g, 0.5 mole) was added over 15 minutes, maintaining the temperature below 25° C. Pyridine (39.5 g, 0.5 mole) containing 4.5 g. of water was added over 15 minutes. The resulting viscous paste was then stirred at 60-70° C. for 30 minutes and held at that temperature overnight. Then the molecular sieve was removed by centrifugation and a sample of polymer was isolated by pouring the centrifuged solution into water, thus effecting precipitation of polymer. This was collected, washed with water, dissolved in N,N-dimethylacetamide and stirred overnight. This solution was centrifuged to remove residual molecular sieve and then poured into water to isolate the polymer in the usual manner. The inherent viscosity of this polymer was 1.45.

EXAMPLE 39

Preparation of p-aminobenzoyl chloride·HCl, CH₂Cl₂ solvent p-Aminobenzoic acid (219.0 g., 1.60 moles) and methylene chloride (1200 ml.) were cooled to 10° C. in a three-necked, round bottom flask equipped with thermometer, stirrer and nitrogen inlet, under a cover of nitrogen. N,N-dimethylacetamide (348.5 g., 4 moles) was added rapidly. The temperature rose to 20° C. and then lowered to −10° C. Thionyl chloride (399.0 g., 3.55 moles) was added over 45 minutes keeping the temperature below 2° C. Anhydrous hydrogen chloride was introduced above the surface at a rate of 4.5 moles/hour for 15 minutes with vigorous stirring. Then 1400 ml. of methylene chloride was added and the remainder of the hydrogen chloride was introduced at the same rate for 1.25 hr. (6.75 moles total). The temperature rose to 20° C. during this step. The slurry of p-aminobenzoyl chloride hydrochloride was cooled to 10° C. and the product collected by filtration. The cake was washed with 2500 ml. of methylene chloride in four portions and dried in a stream of nitrogen. The yield of p-aminobenzoyl chloride hydrochloride was 237.5 g., 1.24 moles, 77.3%. The inherent viscosity of the polymer prepared from this monomer was 3.56.

EXAMPLE 40

Preparation of p-aminobenzoyl chloride hydrochloride in CH₂Cl₂ solvent (polymer spun to fiber)

A round bottom flask equipped with mechanical stirrer, thermometer, nitrogen inlet and dropping funnel was charged with 302.0 g. (2.20 moles) of p-aminobenzoic acid and 1650 ml. of CH₂Cl₂ (5.5 moles) of N,N-dimethylacetamide was added over six minutes while keeping the temperature below 13° C. The mixture was again cooled and 547 g. (4.6 moles) of thionyl chloride was added over a 57 minute period while maintaining the temperature at −5° to 0° C. Hydrogen chloride was introduced into the reaction mixture over a period of 1.75 hours during which time the temperature was maintained below 18° C. An additional 6150 ml. of CH₂Cl₂ was added thirty minutes after the hydrogen chloride addition was started.

The precipitated p-aminobenzoyl chloride hydrochloride was then collected, rinsed with 2700 ml. of CH₂Cl₂ in two portions and dried under a stream of N₂. The yield was 343.3 g. (81.2%). This product was polymerized (N_inh 2.80) and spun into fiber having a tenacity of 11.4 g./d.

EXAMPLE 41

Preparation of p-aminobenzoyl chloride hydrochloride in CH₂Cl₂ from p-aminobenzoic acid hydrochloride An apparatus as used in Example 38 was charged with 34.7 g. (0.20 mole) of p-aminobenzoic acid hydrochloride and 100 ml. of CH₂Cl₂. This mixture was cooled to −5° C. and 48.0 g. (0.403 mole) added. Then 26.0 g. (0.30 mole) of N,N-dimethylacetamide was added over a period of ten minutes keeping the temperature below 0° C. The reaction mixture was brought to 25° C. in 15 minutes and maintained at that temperature for 2.5 hours. Then 0.27 mole of hydrogen chloride gas was added and the mixture was stirred overnight at room temperature. The precipitated p-aminobenzoyl chloride hydrochloride was collected, rinsed with CH₂Cl₂ and dried in a stream of nitrogen. The yield was 32.0 g. (84.7%).

EXAMPLE 42

Preparation of p-aminobenzoyl chloride hydrochloride in fluorocarbon solvent

A three-necked round bottom flask equipped with mechanical stirrer, thermometer, nitrogen inlet and dropping funnel was charged with 27.4 g. (0.20 mole) of p-aminobenzoic acid and 200 ml. of 1,1,2-trichlorotrifluoroethane under a nitrogen atmosphere. To this stirred slurry was added at room temperature, 60 ml. (0.65 mole) of N,N-dimethylacetamide over a two minute period. After cooling to —5° C., 49.0 g. (0.41 mole) of thionyl chloride was added dropwise over two hours while maintaining the temperature below 0° C. Then 0.05 mole of hydrogen chloride gas was introduced into the reaction mixture at 0°, the mixture was filtered and the collected cake of N,N-dimethylacetamide hydrochloride was rinsed with 450 ml. of cold (5° C.) 1,1,2-trichlorotrifluoroethane. The combined filtrates were then treated with a large excess of hydrogen chloride gas to convert the p-thionylaminobenzoyl chloride to p-aminobenzoyl chloride hydrochloride which was ultimately isolated as the corresponding methyl ester.

To the above suspension of p-aminobenzoyl chloride hydrochloride at room temperature was added 20 ml. of methanol over a period of one hour. After stirring for an additional two hours at room temperature, the product, methyl - p - aminobenzoate hydrochloride was collected, rinsed with 200 ml. of 1,1,2 - trichlorotrifluoroethane and dried in a vacuum desiccator giving 23.0 g. (61.3%
dried in a vacuum desiccator giving 23.0 g. (61.3% yield).

EXAMPLE 43

Preparation of p-aminobenzoyl chloride hydrochloride employing excess thionyl chloride as the solvent To a round bottom flask equipped with mechanical stirrer, dropping funnel, thermometer and nitrogen inlet was added 100 ml. of $SOCl_2$ and 27.40 g. (0.20 mole) of p-aminobenzoic acid under a blanket of nitrogen. The resulting slurry was cooled to —5° C. and 43.56 g. (0.50 mole) of N,N-dimethylacetamide was added over a period of 22 min. while maintaining the temperature below 9° C. The reaction solution was then warmed to 20° C. over a period of 15 min. and anhydrous hydrogen chloride was introduced above the reaction solution surface at the rate of 1.1 moles/hr. for 20 minutes after which time 100 ml. of $CH_2Cl_2$ was added to reduce the viscosity of the resulting thick slurry. The hydrogen chloride addition was then continued until a total of 1.8 moles had been added. The product was then collected by filtration and the cake was washed with 600 ml. of $CH_2Cl_2$ and dried at reduced pressure in a desiccator. The yield of p-aminobenzoyl chloride hydrochloride was 30.95 g. (80.6%).

EXAMPLE 48

Proof of the formation of p-thionylaminobenzoyl chloride in quantitative yield

A sample of p-thionylaminobenzoyl chloride was prepared and purified by distillation at reduced pressure according to the procedure of Graf and Langer. A solution of this material in N,N-dimethylacetamide of known concentration was prepared and analyzed with a Cary 15 UV-Vis. Spectrophotometer. The visible spectrum of p-thionylaminobenzoyl chloride in this solvent displayed a maximum absorption at 333 mμ with an extinction coefficient (ε) of 18,200.

To a solution of 6.86 g. (0.050 mole) of p-aminobenzoic acid in 100 ml. of N,N-dimethylacetamide was added dropwise 11.9 g. (0.10 mole) of thionyl chloride while maintaining the temperature between —5° to 0° C. A portion of this reaction mixture was then filtered to remove the precipitated N,N-dimethylacetamide hydrochloride and one ml. of the filtrate was diluted to 4,000 ml. The visible spectrum of this solution of p-thionylaminobenzoyl chloride was identical to that of the authentic sample prepared above. It displayed a maximum absorption at 333 mμ with an absorbance of 2.26. This corresponds to a concentration of 0.496 M of p-thionylaminobenzoyl chloride in the reaction mixture or a total of 0.0496 mole in the 100 ml. of solution. Thus, the yield of p-thionylaminobenzoyl chloride based on p - aminobenzoic acid is 99.2%, essentially quantitative within experimental error.

EXAMPLE 49

Preparation of dimer using a ratio of 1:1.05:.80 of p-aminobenzoic acid:$SOCl_2$:N,N-dimethylacetamide 137.1 grams of p-aminobenzoic acid (1.00 mole) and 125.0 g. of thionylchloride (1.05 moles) were combined in a round bottom, 4-necked flask equipped with thermometer, stirrer, nitrogen inlet and dropping funnel. The mixture was cooled in an acetone/ice bath and 69.7 g. N,N - dimethylacetamide (0.80 mole) was added over 45 minutes. The cooling bath was then removed and the temperature was allowed to rise to ambient over the next 30 minutes. 3.6 grams of hydrogen chloride (0.10 mole) was then added and the reaction mass was stirred at ambient temperature for 3 hours. An infrared spectrum taken during this period indicated the reaction was not complete. The reaction mass was extremely viscous and was thinned out by saturating the mass with sulfur dioxide at 0°. The reaction mass was allowed to return to ambient temperature and then stirred overnight. The reaction mixture was then stripped of volatile components by applying a vacuum of 0.25 mm. Hg for two hours. The vacuum was released under nitrogen. The solids were pulverized and placed under high vacuum for an additional 2 hours. The product weighed 238.2 g. (95.2% yield). It consisted of 126.7 g. dimer, 17.2 g. oligomer and 94.3 g. N,N-dimethylacetamide hydrochloride.

The product composed essentially of 1 mole of dimer and 1.6 moles of N,N-dimethylacetamide hydrochloride was polymerized to give a polymer with $N_{inh}$ 2.90 and fiber spun had T/E/Mi of 5.2/5.6/257.

DIRECT PREPARATION OF P-AMINOBENZOYL CHLORIDE HYDROCHLORIDE FROM 1 MOLE p-AMINOBENZOIC ACID

| Ex. No. | $SOCl_2$ (mole) | DMAc (mole) | Liq. vol./ Med. (ml.) | Addition temp. (° C.) | Reaction temp. (° C.) | Reaction time (hr.) | Dilution vol. (ml.) | HCl (mole) | Yield (percent) | Comment |
|---|---|---|---|---|---|---|---|---|---|---|
| 44 | 2.02 | 1.00 | $CH_2Cl_2$/500 | 10 | 27 | 5 | 500 | 1.22 | 83.8 | These examples show the relationship between the amount of DMAc used and the amount of HCl. Also shows the relationship of reaction time and DMAc used. |
| 45 | 2.02 | 1.50 | $CH_2Cl_2$/375 | 5 | 20 | 3.9 | 880 | 2.05 | 86.0 | |
| 46 | 2.02 | 2.50 | $CH_2Cl_2$/1,750 | 4 | 20 | .75 | | 3.12 | 88.0 | |
| 47 | 2.02 | 3.00 | $CH_2Cl_2$/1,250 | 20 | 20 | .67 | | 3.50 | 66.0 | |

EXAMPLE 50

Preparation of dimer using a ratio of 1:1.05:0.9 of p-aminobenzoic acid:$SOCl_2$:N,N-dimethylacetamide 137.1 grams of p-aminobenzoic acid (1.00 mole), 125.0 g. of thionyl chloride (1.05 moles) and 78.4 g. of N,N-dimethylacetamide (0.90 mole) were combined and treated as in Example 49. The use of sulfur dioxide to thin out the reaction mass however was not required. The reaction was finished after 3 hours of stirring at ambient temperature. The dried reaction mixture weighed 251.8 g. (96.2% yield) and consisted of 124.3 g. dimer, 20.5 g. oligomer and 107.0 g. N,N-dimethylacetamide hydrochloride.

The product mixture composed of 1 mole of dimer, and 1.8 moles of N,N-dimethylacetamide hydrochloride was polymerized to give a polymer with $N_{inh}$ 3.67.

The intermediates of this invention are useful in the preparation of high molecular weight p-benzamide polymers. High molecular p-benzamide polymers are useful in the preparation of fibers and films for applications requiring high strength and resistance to thermal degradation.

The dopes of the p-benzamide polymers obtained can be cast into self-supporting films, extruded into fibers by conventional means or formed in fibrids by shear precipitation techniques. They can also be used as liquid coating compositions which are applied to various substrates.

The foregoing detailed description has been given for clarity of understanding only and no unnecessary limitations are to be understood therefrom. The invention is not limited to exact details shown and described for obvious modifications will occur to one skilled in the art.

What is claimed is:

1. A process wherein one mole of p-aminobenzoic acid or its hydrochloride is reacted with at least one mole of thionyl chloride in the presence of at least 0.1 mole of a base compound selected from the group consisting of a tertiary $C_1$–$C_4$ alkyl amine, a heterocyclic tertiary amine, an N–$C_1$–$C_4$ alkyl substituted amide of an organic carboxylic acid having at least 2 and generally not more than 7 carbon atoms, an N–$C_1$–$C_4$ substituted lactam of an ω-amino acid containing 4–6 carbon atoms, tetramethylurea, hexamethylphosphoramide at a temperature of from about −10° C. to about 95° C.

2. The process of claim 1 wherein at least 2 moles of the thionyl chloride are reacted [ to produce one or more of a compound selected from the group consisting of p-thionylaminobenzoyl chloride, p-aminobenzoyl chloride hydrochloride, 4-(4′-aminobenzamido)benzoyl chloride hydrochloride and oligomers of p-aminobenzoyl chloride hydrochloride].

3. The process of claim 1 wherein at least 2 moles of thionyl chloride are reacted in the presence of a solvent or non-solvent.

4. The process of claim 1 wherein at least 2 moles of thionyl chloride are reacted in the presence of a hydrochloride of said base compound.

5. The process of claim 2 wherein 1 mole of p-aminobenzoic acid is reacted with at least 2 moles of thionyl chloride in the presence of at least 3 moles of said base compound at a temperature of from about −10° to about 25° C. to produce p-thionylaminobenzoyl chloride.

6. The process of claim 2 wherein 1 mole of p-aminobenzoic acid hydrochloride is reacted with at least 2 moles of thionyl chloride in the presence of at least 4 moles of said base compound at a temperature of from about −10° to about 25° C. to produce p-thionylaminobenzoyl chloride.

7. The process of claim 3 wherein 0.1 to 3 moles of said base compound are used in the presence of a solvent at a temperature of from about −10° to about 25° C. and sufficient hydrogen chloride is added to the resultant reaction mixture to produce p-aminobenzoyl chloride hydrochloride.

8. The process of claim 7 wherein a non-solvent is used in place of the solvent.

9. The process of claim 5 wherein 3 to 30 moles of said base compound are used and subsequently 1 to 2 moles of water or water precursor are added to produce a p-benzamide polymer.

10. The process of claim 6 wherein 4 to 30 moles of base compound are used and subsequently 1 to 2 moles of water or water precursor are added to produce a p-benzamide polymer.

11. The process of claim 9 wherein the base compound is N,N-dimethylacetamide.

12. The process of claim 9 wherein a neutralizing agent selected from the group consisting of an alkali metal hydroxide, oxide, carbonate and hydride; an alkaline earth metal hydroxide, oxide, carbonate and hydride; and aqueous ammonium hydroxide is added with or following the water or water precursor.

13. The process of claim 12 wherein an $SO_2$ absorbent is added before the water or water precursor.

14. The process of claim 12 wherein the alkali metal is lithium.

15. The process of claim 1 wherein 1 to 2 moles of thionyl chloride are reacted in the presence of 0.1 to 3 moles of the base compound.

16. The process of claim 15 wherein the reaction is caried out in the presence of a hydrochloride of said base.

17. The process of claim 15 wherein 1 to 1.2 moles of thionyl chloride are reacted in the presence of 0.5 to 1 mole of the base compound at a temperature of from about −10° to 50° C. and the compound produced is essentially 4-(4′-aminobenzamido)benzoyl chloride hydrochloride.

18. The process of claim 17 wherein the base compound is N,N-dimethylacetamide.

19. The process of claim 17 wherein the temperature is subsequently increased to a range of about 50° to 95° C. and essentially oligomers of p-aminobenzoyl chloride hydrochloride are prepared.

20. The process of claim 19 wherein the base compound is N,N-dimethylacetamide.

21. The process of claim 17 wherein the reaction is caried out in the absence of a solvent or non-solvent.

22. The process of claim 17 wherein the reaction is carried out in the presence of a solvent and after the 4-(4′-aminobenzamido)benzoyl chloride hydrochloride is produced, a non-solvent is added in an amount to precipitate the base hydrochloride and the 4-(4′-aminobenzamido)benzoyl chloride hydrochloride is obtained in admixture with the base hydrochloride by filtration.

23. The process of claim 17 wherein the reaction is carried out in the presence of a non-solvent and the 4-(4′-aminobenzamido)benzoyl chloride hydrochloride is obtained in admixture with the base hydrochloride after separation by filtration or evaporation of the non-solvent.

24. The process of claim 17 wherein $SO_2$ is removed, a polymerization solvent and a neutralization agent are added and a spin dope of p-benzamide polymer is obtained.

25. The process of claim 15 wherein 1 to 1.2 moles of thionyl chloride and 1 to 2 moles of the base compound are used to produce a mixture comprising 4-(4′-aminobenzamido)benzoyl chloride hydrochloride and oligomers of p-aminobenzoyl chloride hydrochloride.

26. The process of claim 25 wherein the base compound is N,N-dimethylacetamide.

27. The process of claim 25 wherein the reaction is carried out in the absence of solvent or non-solvent.

28. The process of claim 25 wherein the reaction is carried out in the presence of a solvent and after the mixture is produced, a non-solvent is added and the mixture is obtained in admixture with the base hydrochloride by filtration.

29. The process of claim 25 wherein the reaction is carried out in the presence of a non-solvent and the mixture is obtained in admixture with the base hydrochloride after separation by filtration or evaporation of the non-solvent.

30. The process of claim 25 wherein $SO_2$ is removed, a polymerization solvent and neutralization agent are added and a spin dope of p-benzamide polymer is obtained.

31. The process of claim 15 wherein 1 to 1.2 moles thionyl chloride and 2 to 3 moles of the base compound are used to produce essentially oligomers of p-aminobenzoyl chloride hydrochloride.

32. The process of claim 31 wherein the reaction is carried out in the absence of solvent or non-solvent.

33. The process of claim 31 wherein the reaction is carried out in the presence of a solvent and after the oligomers are produced, a non-solvent is added and the oligomers obtained in admixture with the base hydrochloride by filtration.

34. The process of claim 31 wherein the reaction is carried out in the presence of a non-solvent and the oligomers are obtained in admixture with the base compound in the form of a base hydrochloride after separation by filtration or evaporation of the non-solvent.

35. The process of claim 31 wherein the base compound is N,N-dimethylacetamide.

36. The process of claim 31 wherein $SO_2$ is removed, a polymerization solvent and a neutralization agent are added and a spin dope of p-benzamide polymer is obtained.

References Cited

UNITED STATES PATENTS

| | | | |
|---|---|---|---|
| 3,203,933 | 8/1965 | Huffman et al. | 260—78 |
| 3,225,011 | 12/1965 | Preston et al. | 260—78 |
| 3,240,758 | 3/1966 | Smith et al. | 260—78 |
| 3,541,056 | 11/1970 | Pikl | 260—78 |

OTHER REFERENCES

Rez. Facultad Humanidad y Clenc, 2, No. 3, pp. 65–73 (1958), Riesz.

J. Prakt. Chem. (2), 148, pp. 161–169 (1937), Graf et al.

Ber. 81, pp. 215–221 (1948), Brederick, von Schuh

Makrom. Chem. 130, pp. 55–64 (1969), Lorenz et al.

HOWARD E. SCHAIN, Primary Examiner

U.S. Cl. XR.

260—29.2 N, 544 M